(12) United States Patent
Bickmann et al.

(10) Patent No.: US 7,870,794 B2
(45) Date of Patent: Jan. 18, 2011

(54) DEVICE FOR MEASURING A MASS FLOW

(75) Inventors: Frank Bickmann, Brilon (DE); Bernhard Penno, Brilon (DE)

(73) Assignee: Rembe GmbH Safety + Control, Brilon (DE)

( * ) Notice: Subject to any disclaimer, the term of this patent is extended or adjusted under 35 U.S.C. 154(b) by 154 days.

(21) Appl. No.: 12/394,367

(22) Filed: Feb. 27, 2009

(65) Prior Publication Data

US 2010/0011881 A1 Jan. 21, 2010

(30) Foreign Application Priority Data

Feb. 28, 2008 (DE) ........................ 10 2008 011 564

(51) Int. Cl.
*G01F 1/78* (2006.01)
(52) U.S. Cl. .................................. 73/861.351
(58) Field of Classification Search ............. 73/861.27, 73/861.71, 861.73; 460/6
See application file for complete search history.

(56) References Cited

U.S. PATENT DOCUMENTS

| | | | |
|---|---|---|---|
| 1,883,017 A | 10/1932 | Sholtz | |
| 5,002,140 A | 3/1991 | Neumüller | |
| 6,471,032 B2 * | 10/2002 | Busschaert et al. | 198/312 |
| 6,616,527 B2 * | 9/2003 | Shinners et al. | 460/6 |

FOREIGN PATENT DOCUMENTS

| | | |
|---|---|---|
| EP | 0753720 A1 | 1/1997 |
| EP | 0851216 A2 | 7/1998 |
| EP | 0877234 A2 | 11/1998 |

OTHER PUBLICATIONS

German Search Report, Deutsches Patent—und Markenamt, dated Oct. 2, 2008.

* cited by examiner

*Primary Examiner*—Jewel Thompson
(74) *Attorney, Agent, or Firm*—Norris McLaughlin & Marcus, PA; Chrisla Hildebrand, Esq.

(57) ABSTRACT

A device for measuring a mass flow (5) with guide means (4) having a surface shaped as a circular arc, across which the mass flow can flow during the measurement, and a force sensor (2), wherein the guide means (4) is supported above the force sensor (2) and the support occurs on a straight line extending through an endpoint of a radius vector $\vec{r}_{TO}$ of a resulting friction force F acting on the mass flow (5) in the direction of the resulting friction force F acting on the mass flow (5).

17 Claims, 9 Drawing Sheets

DEVICE FOR MEASURING A MASS FLOW

Figure 1:
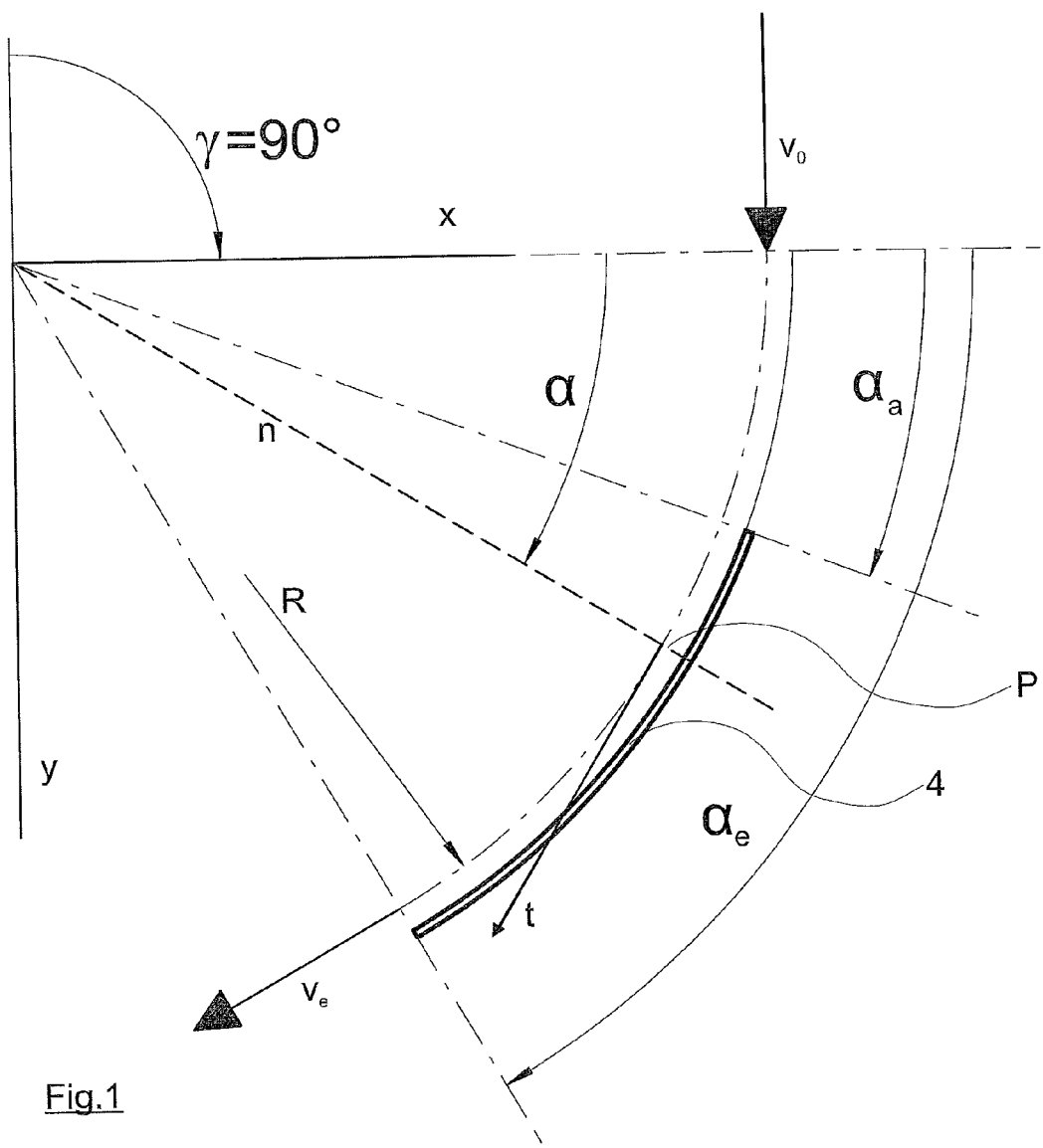

BACKGROUND OF THE INVENTION (1) Field of the Invention

The present invention relates to a device for measuring a mass flow with a guide means having a surface shaped as a circular arc, over which the mass flow can flow during the measurement, and a force sensor.

(2) Description of Related Art

The German published application DE 18 02 213 discloses a device of this type. The guide means of the device is pivotally supported and has an extension arm which operates on the force sensor when the guide means performs a pivoting motion. During the flow across the guide means, a mass flow flowing across the guide means experiences a centripetal force that is proportional to the moving mass. A force in the opposite direction counteracts the centripetal force applied by the guide means on the moving mass, which in conjunction with the friction forces generated by the mass particles produces a pivoting motion of the guide means about its pivot point. The torque of this pivoting motion is transferred to the force sensor by the extension arm of the guide means. The force sensor generates from the torque a sensor signal which corresponds to the force exerted by the force transfer point on the extension arm on the pivot point where the force sensor is located.

The location of the pivot point of the guide means can be defined in a manner described in the published application, which discloses that effects, which are produced by the friction of the mass particles during their flow along the guide means, are substantially compensated with the predefined location of the pivot point of the guide means. However, the method disclosed in the printed application for determining the pivot point is only qualitative. A quantitative method for determining the pivot point that is mathematically or mechanically founded is not disclosed. Compared to the conventional methods for determining mass flow, the device disclosed in the published application is superior, but does not satisfy the requirements for an exact measurement of the mass flow, where all effects caused by friction need to be compensated.

It is therefore an object of the invention to design a device of the aforedescribed type so that the mass flow can be measured with greater accuracy than before. In particular, effects caused by friction between the mass particles and the guide plate are compensated.

BRIEF SUMMARY OF THE INVENTION

This object is attained by the invention in that guide means are pivotally supported via the force sensor, and that the support occurs on a straight line which extends through an endpoint of a radius vector of a resulting friction force operating on the mass flow and in the same direction as the resulting friction force operating on the mass flow. The point where the guide means are supported is therefore determined depending on the friction force. The friction force can then be compensated so that the force measurement of the centripetal force is unaffected by the friction force, and the mass flow can then be determined from the friction force. Material-dependent quantities, such as the friction coefficient, are taken into consideration when computing the friction force.

The resulting friction force represents the entirety of the friction forces generated when the mass particles flow along the surface shaped as a circular arc. These partials forces are added and yield the resulting friction force.

If the support point is located on the line of the effective force and if the direction in which the force sensor is able to measure forces is perpendicular to the resulting friction force, then the resulting friction force has no effect on the measurement by the force sensor. The resulting friction force is therefore irrelevant for this measurement.

The line on which the guide means are supported can be inclined by an angle $\eta$ of $$\eta = \arctan\frac{r_{T0,y}}{r_{T0,x}}$$

with respect to the horizontal, wherein the radius vector $\vec{r}_{TO}$ is representative of the resulting friction force operating on the mass flow. For a friction coefficient of $\mu=0.1$ of the flowing mass, the angle $\eta$ can be about $\eta=48.48°$. For a friction coefficient of $\mu=0.2$ of the flowing mass, the angle $\eta$ can be $\eta=48.70°$. For a friction coefficient of $\mu=0.3$, the angle $\eta$ can be preferably $\eta=48.88°$. In a particular embodiment of the device, the radius vector $\vec{r}_{TO}$ of the resulting friction force F can be oriented horizontally. In this case, the resulting friction force F would be vertical which results in a corresponding support of the guide means.

Preferably, the support is located at the endpoint of the radius vector $\vec{r}_{TO}$ of the resulting friction force F operating on the mass flow.

The force measurement direction of the force sensor, i.e., the direction from which the force sensor can measure forces, is preferably along the direction of the radius vector $\vec{r}_{TO}$ of the resulting friction force F acting on the mass flow. Because of the radius vector $\vec{r}_{TO}$ is perpendicular to the resulting friction force F, the force measurement directions is also perpendicular to the resulting friction force F The resulting friction force F is therefore not a factor in the measurement of the force sensor.

The guide means can be supported on the force sensor, i.e., the guide means is preferably attached to a force-sensitive or to the force-receiving surface of the force sensor. Alternatively, the guide means can be rigidly connected with the force sensor and an assembly which includes the guide means and the force sensor can be supported on a holding means. The support then also occurs on the force-sensitive surface of the force sensor.

The guide means of the device of the invention can be a curved tube, a measurement chute, a slide, and the like.

The device may include a supply means which is suitable and configured to supply the mass flow to the guide means. Such supply means can include one or more elements for uniformly distributing the volume flow over a cross section through which the volume flow flows. The resulting tangential force can only be computed in a simplified manner by assuming a uniform distribution of the flow height of the volume flow in the depth of the guide means. An element for uniformly distributing the volume flow may include, for example, an inclined plane across which the volume flow is guided. Alternatively, the element for uniformly distributing the volume flow may also include a nozzle.

In a particular embodiment, the device of the invention may include shut-off means for shutting off the mass flow. The shut-off means may be configured so that the magnitude of the mass flow can be adjusted. The shut-off means can be arranged in the flow directions either before or after the guide means.

The basic features of the invention will be described first with reference to the drawings, followed by a more detailed description of exemplary embodiments of the devices of the invention.

BRIEF DESCRIPTION OF THE SEVERAL VIEWS OF THE DRAWING(S)

Figure 1A:
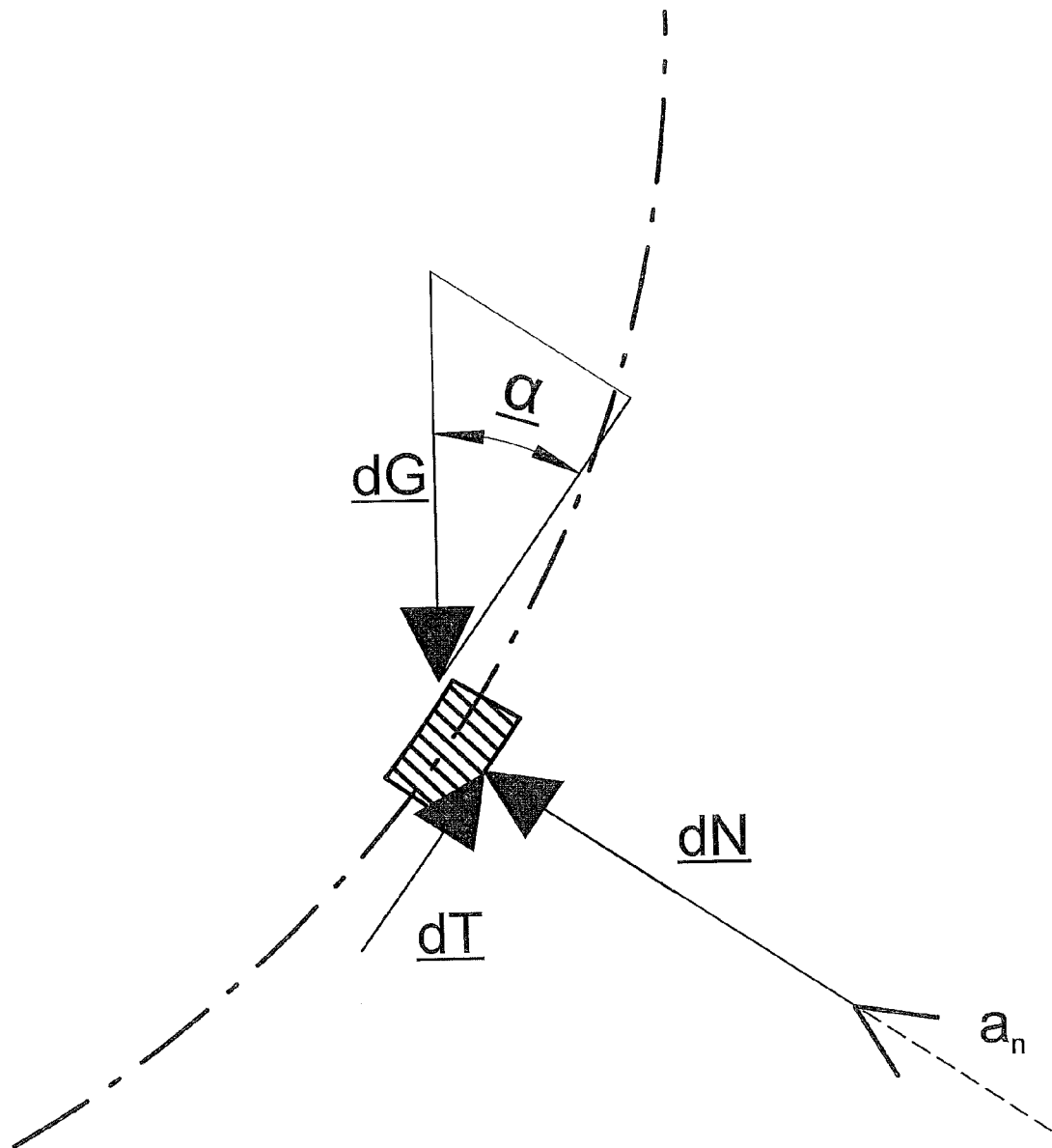
Figure 1B:
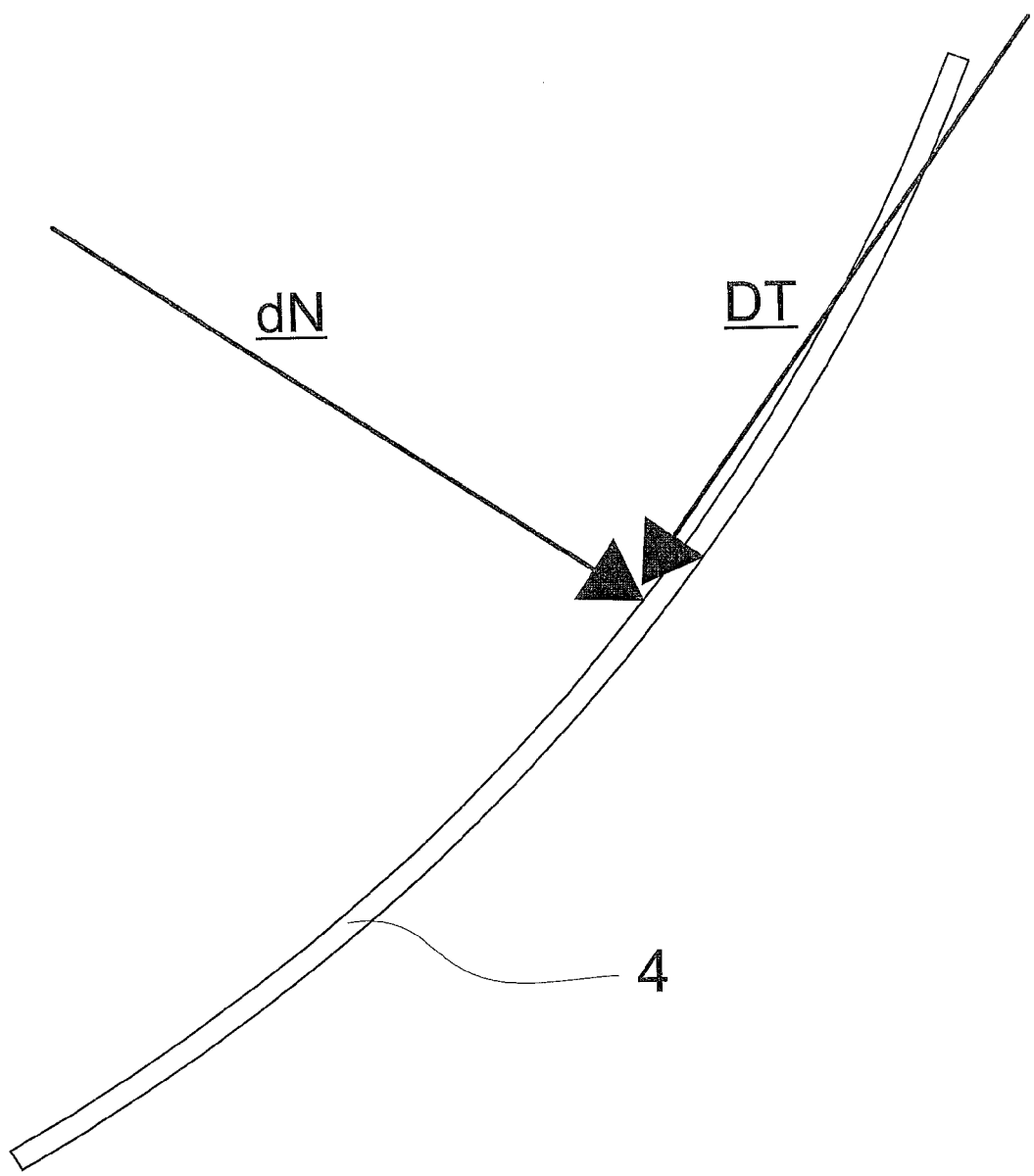
Figure 2:
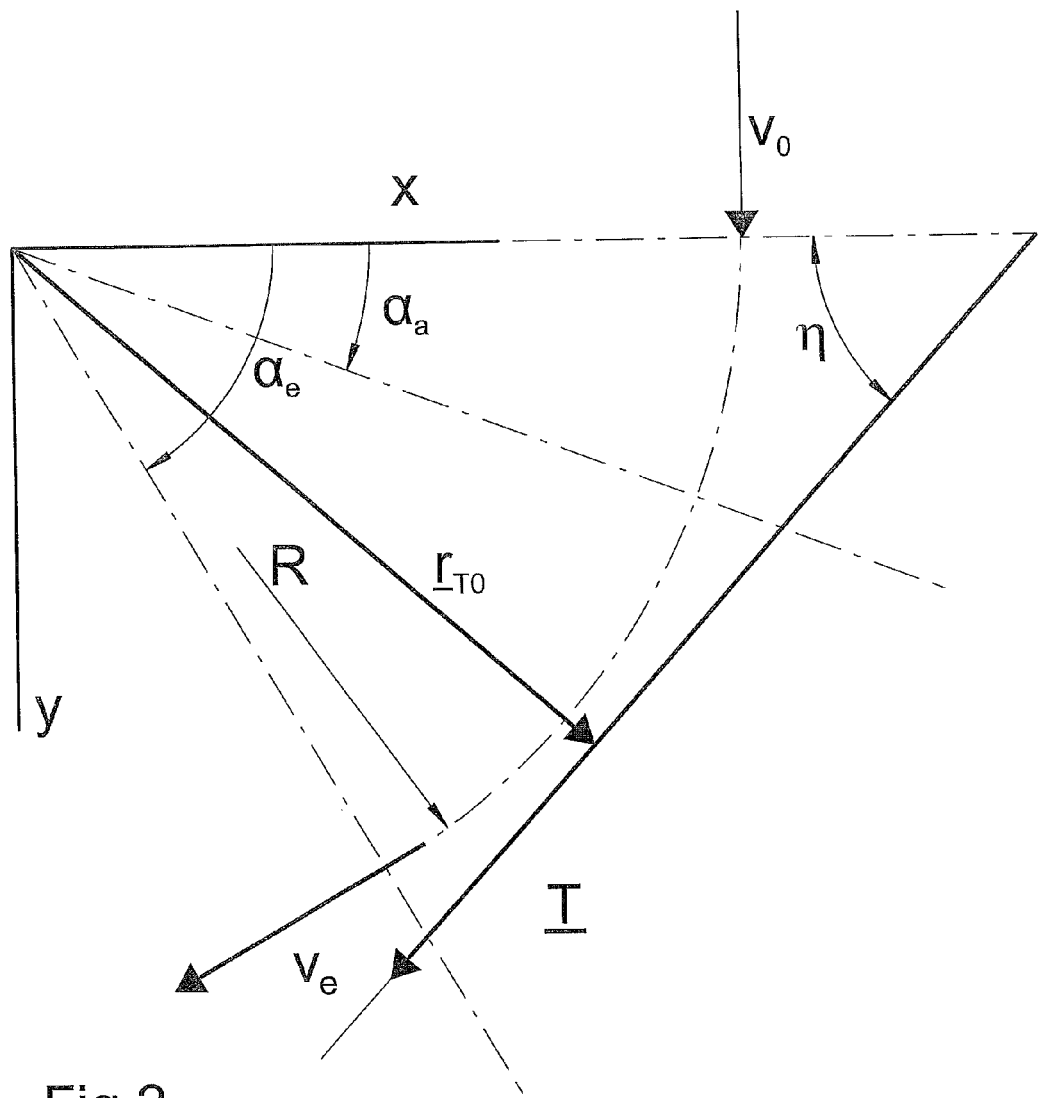
Figure 3:
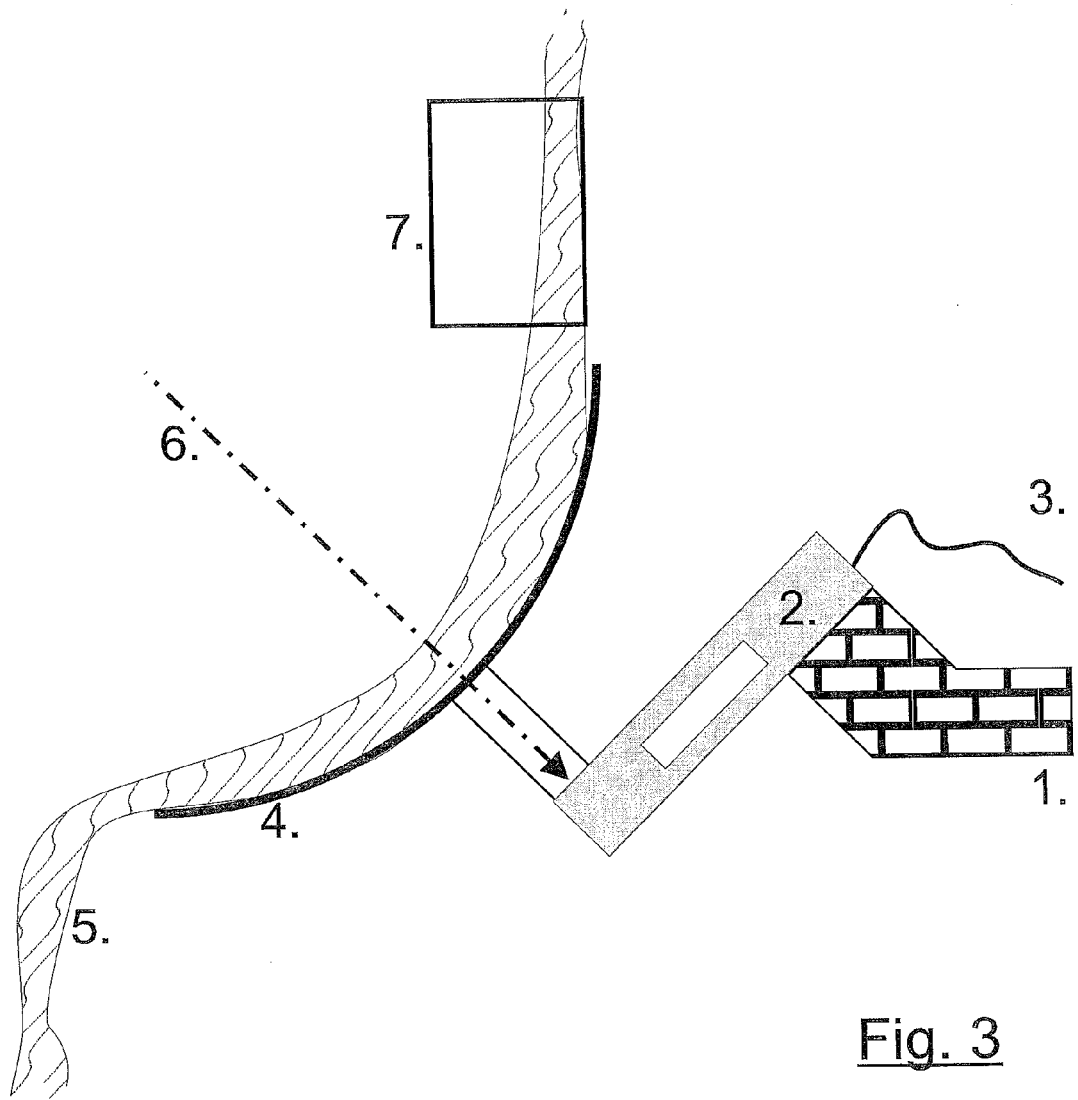
Figure 4:
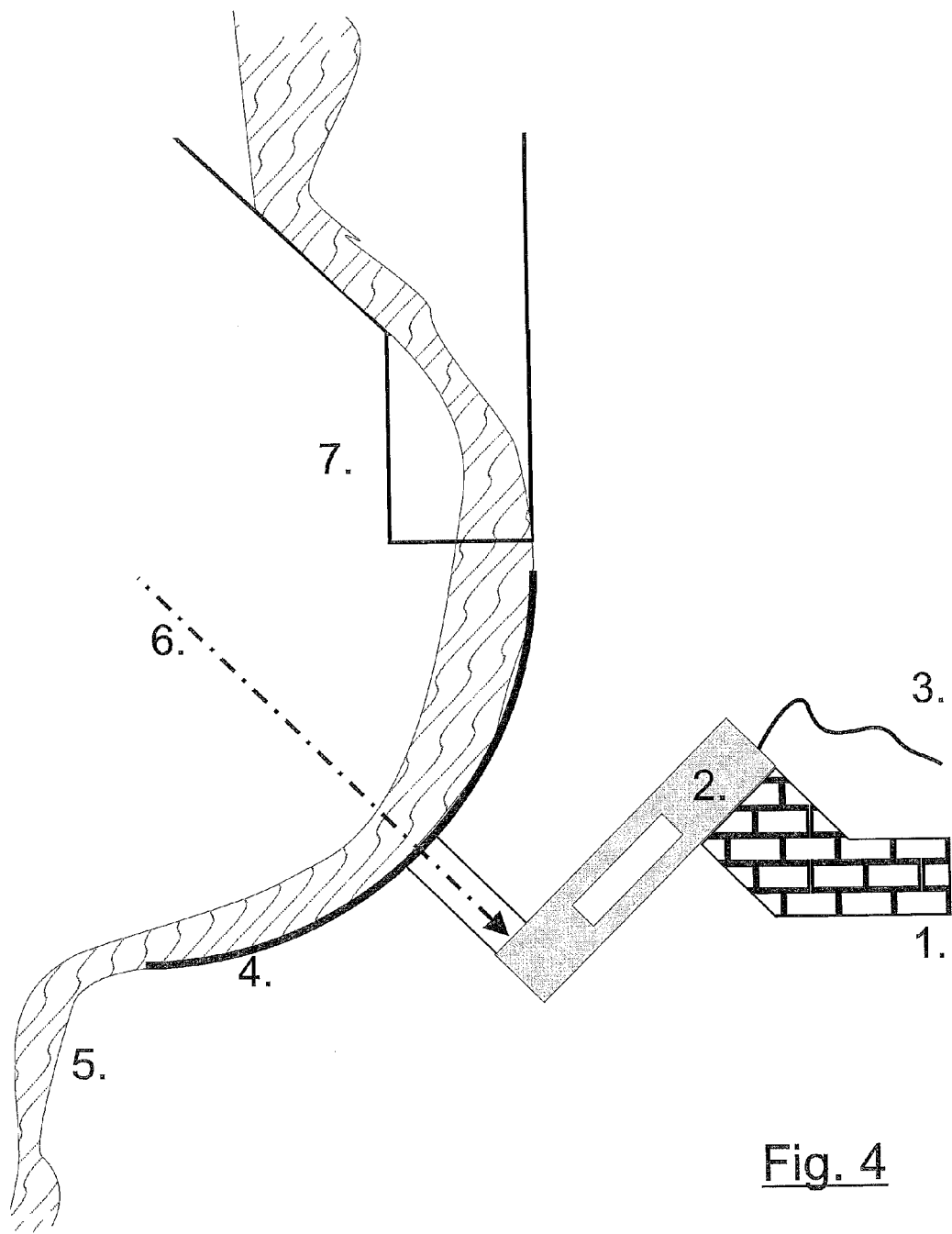
Figure 5:
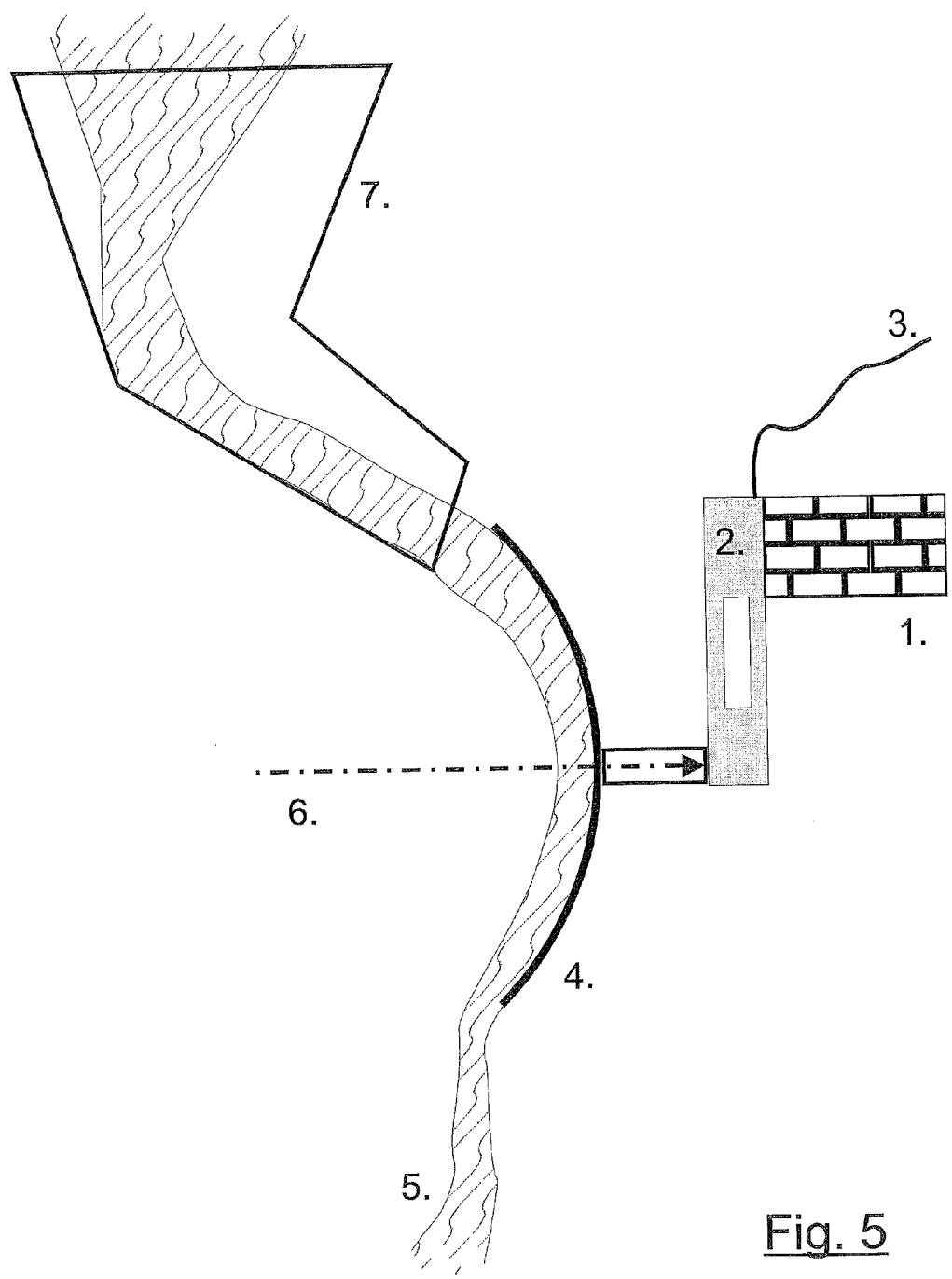
Figure 6:
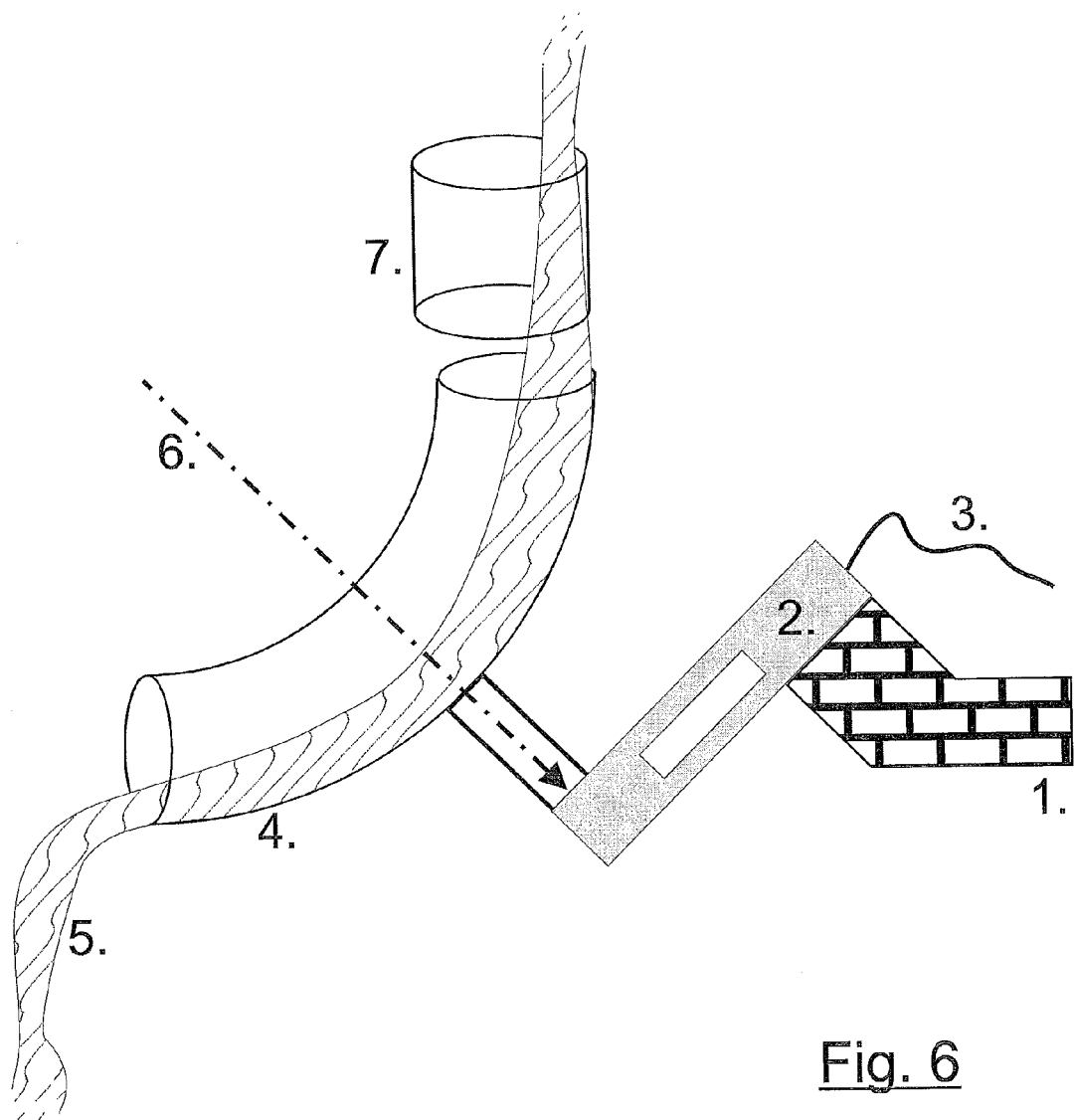
Figure 7:
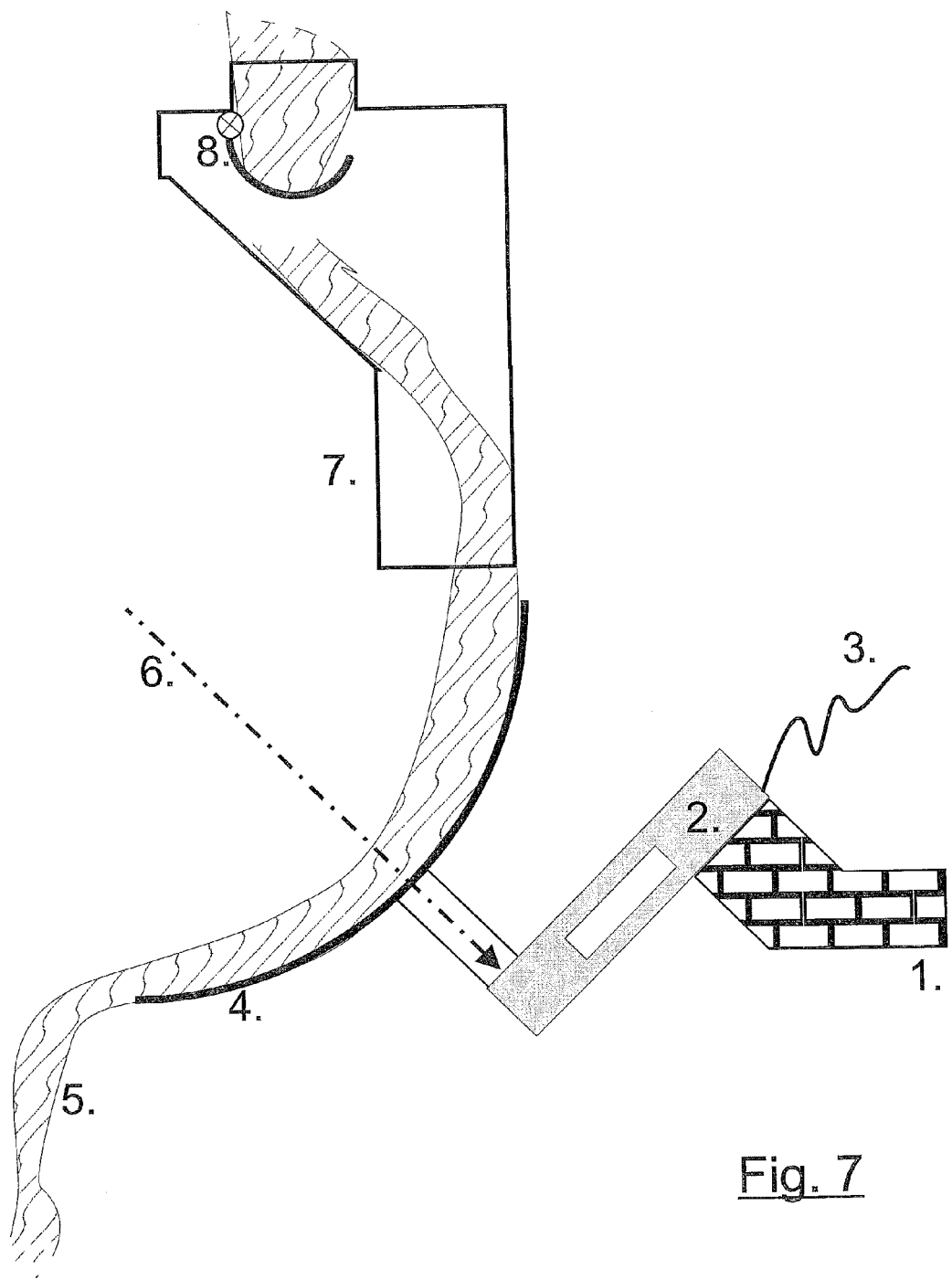

FIG. 1 is a schematic diagram of the geometric arrangement in a device of the invention, FIG. 1a shows the forces operating on a mass particle, FIG. 1b shows the forces acting on a guide means, FIG. 2 shows the vector of the resulting friction force, FIG. 3 shows a schematic diagram of a device of the invention without elements for uniformly distributing the mass flow, FIG. 4 shows a schematic diagram of the device of the invention with elements for uniformly distributing the mass flow, FIG. 5 shows a schematic diagram of the device of the invention with a force sensor in a vertical position, FIG. 6 shows a schematic diagram of the device of the invention with a curved tube as guide means, and FIG. 7 shows a schematic diagram of the device of the invention with shut-off means for adjusting the mass flow.

DETAILED DESCRIPTION OF THE INVENTION

FIG. 1 shows schematically with the reference symbol 4 a measurement chute with a surface in the shape of a circular arc. The surface is curved with a radius R. The measurement chute 4 has a beginning starting at an angle $\alpha_a$ below a horizontal. The end of the measurement chute is located at an angle $\alpha_e$ below the horizontal. In the region between the horizontal and the beginning of the measurement chute 4, the mass flow can flow along a supply means which may be in the shape of a circular arc with the same radius R. A mass particle from the mass flow can flow along the supply means and the guide means in the shape of a circular arc. The center of gravity of the mass particle then flows along an exemplary path with a velocity indicated at the beginning by $\vec{v}_0$ and at the end by $\vec{v}_e$.

A tangent t is indicated at a point P of the path of the mass particle. The normal on the tangent t is indicated with n.

The forces indicated in FIG. 1a act on the mass particle located at point P. A counterforce $d\vec{G}$ also acts on the mass particle. To keep the mass particle on the circle, a centripetal force $d\vec{N}$ with a centripetal acceleration $\vec{a}_n$ acts on the particle. A friction force indicated as $d\vec{T}$ opposes the motion of the particle. The forces indicated in FIG. 1b operate on the point of the measurement chute 4 corresponding to the point P. These include a centrifugal force opposing the centripetal force and the force in the opposite direction of the friction force $d\vec{T}$. Only the centrifugal force operating on the measurement chute is of interest for measuring the mass flow. However, not only the centrifugal force $d\vec{N}$ of an infinitesimally small mass particle is of interest, but the centrifugal force exerted by all the particles located on the measurement chute 4. However, the friction force $d\vec{T}$ of the infinitesimally small mass particle, or of all the mass particles of the mass flow, is not of interest for determining the mass flow. The measurement arrangement therefore needs to be configured so that the force sensor of the measurement device measures only the centrifugal force of the mass particle, and not the friction force $d\vec{T}$.

According to the concept of the invention, the measurement chute 4 is supported so that the force measurement direction of the force sensor is oriented in the direction of the resulting centripetal force and perpendicular to the direction of the resulting friction force $\vec{T}$ of all particles of the mass flow. In order to properly align the force sensor and to support the measurement chute, for example, in the corresponding direction on the force sensor, the direction of the resulting friction force $\vec{T}$ of all mass particles of the mass flow needs to be calculated. The radius vector of the resulting friction force $\vec{T}$ can be determined using mechanical and mathematical principles. From this radius vector, the following quantity is computed:

$$\vec{r}_{T0} = \frac{\vec{T} \times \vec{M}_{T0}}{\vec{T}^2}$$

The tangential force $\vec{T}$ can be computed by numerical integration. The moment $\vec{M}_{T0}$ also follows from the following equation through integration:

$$\vec{M}_{T0} = \vec{r}_{T0} \times \vec{T} = \int_{\alpha a}^{\alpha e} (\vec{r}(\alpha) \times d\vec{T})$$

Because the radius vector of the resulting friction force $\vec{T}$ can be computed, the direction of the friction force $\vec{T}$ can also be determined from the radius vector due to the established orthogonality of the radius vector to the friction force $\vec{T}$. It follows that the direction of the friction force $\vec{T}$ is inclined with respect to a horizontal by the following angle:

$$\eta = 90° - \text{Arctan}\left(\frac{r_{T0y}}{r_{T0x}}\right)$$

The angle of inclination $\eta$ can be determined by numerical computations.

FIGS. 3 to 7 show schematically similar embodiments for devices according to the invention. All illustrated devices include a holding means 1, to which a force sensor 2 is attached. The measurement signal supplied by the force sensor can be supplied via a line 3 to a computing unit which computes the mass flow 5 from the measured force. A guide means is supported on the force sensor 2. The support is arranged so that the resulting centripetal force N is oriented in the force measurement direction of the force sensor. The resulting friction force $\vec{T}$ of the mass flow, on the other hand, is perpendicular to the force measurement direction of the force sensor and can therefore not be detected by the force sensor 2. The measurement signal received from the line 3 therefore corresponds to the centripetal force of the total mass flow.

The mass flow is indicated in FIGS. 3 to 7 with the reference symbol 5. The exemplary embodiments have a different supply means 7. The supply means 7 may include tubular sections, as indicated in FIGS. 3 and 6. However, the supply means 7 can also be implemented as chutes or funnels which uniformly distribute the mass flow 5 across the flow cross-section. This is indicated in FIGS. 4, 5 and 7. The example illustrated in FIG. 6 has the particular feature that instead of a measurement chute a curved tube is used as guide means 4, which also permits the measurement of fluids.

Conversely, in the exemplary embodiment illustrated in FIG. 5 a shut-off means 8 is provided which can be used to control the mass flow.

The invention claimed is:

1. Device for measuring a mass flow (5) comprising:
   a guide means (4) having a surface formed as a circular arc, across which the mass flow is capable to flow during the measurement, and
   a force sensor (2),
wherein the guide means (4) is supported above the force sensor (2), and the support occurs on a straight line which extends through an endpoint of a radius vector $\vec{r}_{T0}$ of a resulting friction force F acting on the mass flow (5) in the direction of the resulting friction force F acting on the mass flow (5).

2. Device according to claim 1, wherein the straight line is inclined with respect to a horizontal by an angle η with $$\eta = \arctan \frac{r_{T0,y}}{r_{T0,x}}$$

wherein $\vec{r}_{T0}$ is the radius vector of the resulting friction force acting on the mass flow (5).

3. Device according to claim 2, wherein the angle η is
   about η=48.48° for a friction coefficient of μ=0.1 of the flowing mass,
   about η=48.70° for a friction coefficient of μ=0.2 of the flowing mass, and
   about η=48.88° for a friction coefficient of μ=0.3 of the flowing mass.

4. Device according to claim 1, wherein the radius vector $\vec{r}_{T0}$ of the resulting tangential force F acting on the mass flow (5) is oriented horizontally.

5. Device according to claim 1, wherein the support occurs at the end point of the radius vector $\vec{r}_{T0}$ of the resulting tangential force F acting on the mass flow (5).

6. Device according to claim 1, wherein a force measurement direction of the force sensor (2) is oriented in the direction of the radius vector $\vec{r}_{T0}$ of the resulting tangential force F acting on the mass flow (5).

7. Device according to claim 1, wherein the guide means (4) is supported on the force sensor (2).

8. Device according to claim 1, wherein the guide means (4) is rigidly connected with the force sensor (4), and an assembly comprising the guide means (4) and the force sensor (2) is supported on a holding means (1).

9. Device according to claim 1, wherein the support occurs at a force-sensitive point or a force-sensitive surface of the force sensor (2).

10. Device according to claim 1, wherein the guide means (4) is a tube shaped as an arcuated tube or a measurement chute or a slide.

11. Device according to claim 1, wherein the device comprises a supply means (7) which is suitable and configured to supply the mass flow (5) to the guide means (4).

12. Device according to claim 11, wherein the supply means (7) comprises one or several elements for uniformly distributing the volume flow across a flow cross-section.

13. Device according to claim 12, wherein an element for providing a uniform distribution comprises an inclined plane across which the mass flow is guided.

14. Device according to claim 12, wherein an element for providing a uniform distribution comprises a nozzle.

15. Device according to claim 1, wherein the device comprises a shut-off means (8) for shutting off the mass flow (5).

16. Device according to claim 15, wherein the shut-off means (8) is arranged in the flow direction upstream of the guide means (8).

17. Device according to claim 15, wherein the shut-off means (8) is arranged in the flow direction downstream of the guide means (8).

* * * * *